Figure 3:
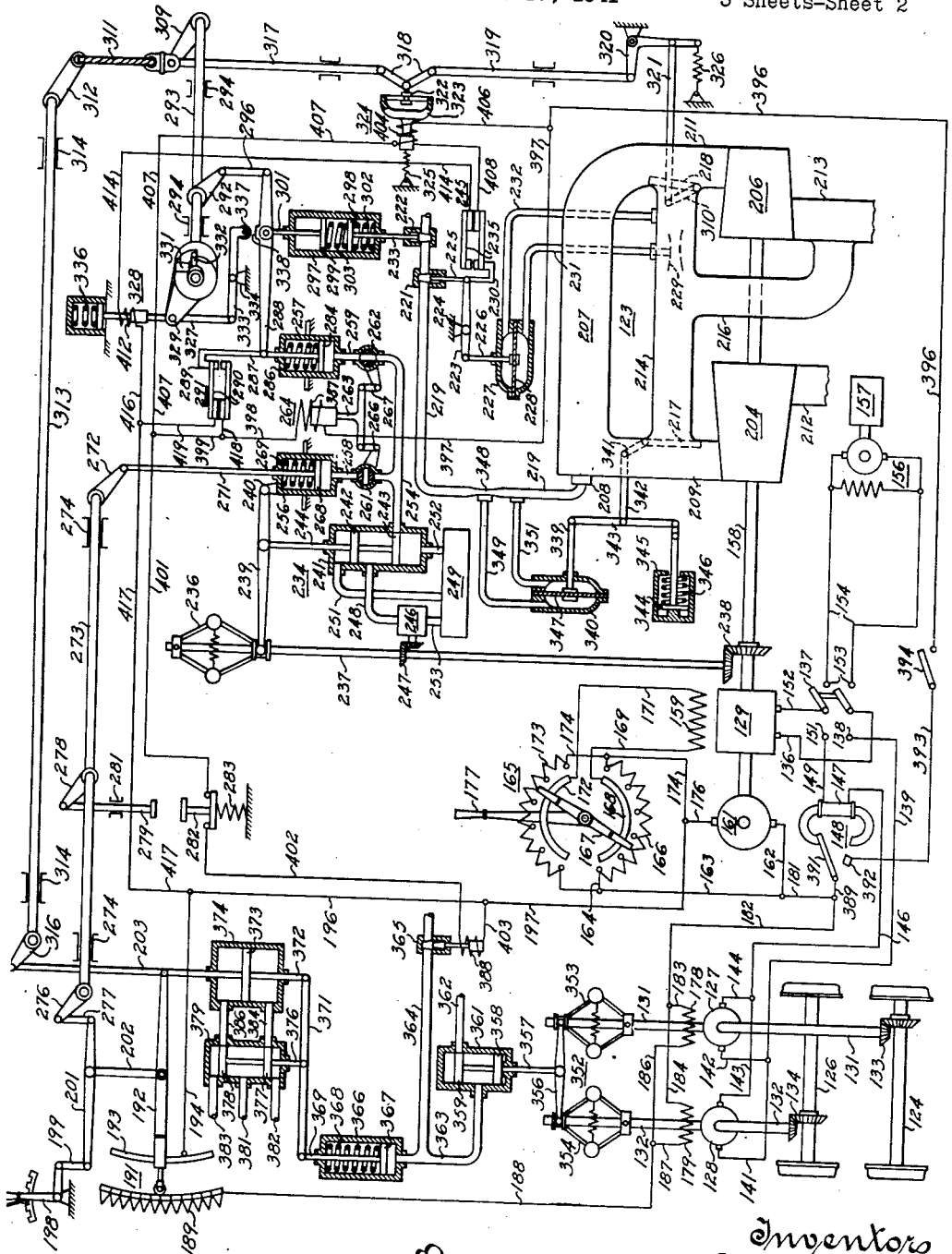

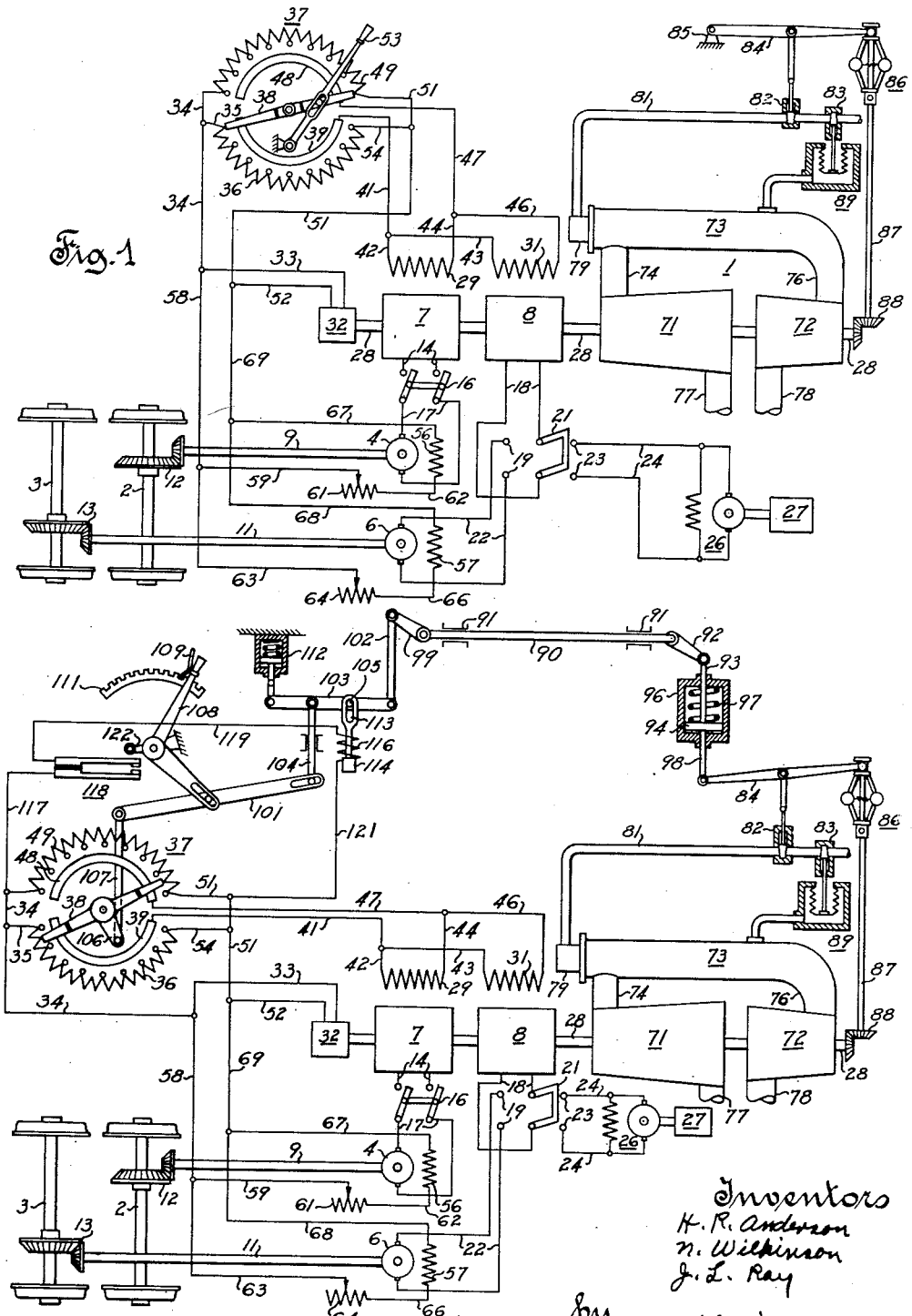

Dec. 7, 1943.   H. R. ANDERSON ET AL   2,336,052
DYNAMIC BRAKING
Filed Feb. 10, 1941   3 Sheets-Sheet 2

Inventors
H. R. Anderson
N. Wilkinson
J. L. Ray
by K. H. Wyman
Attorney

Dec. 7, 1943.  H. R. ANDERSON ET AL  2,336,052
DYNAMIC BRAKING
Filed Feb. 10, 1941  3 Sheets-Sheet 3

Inventors
H. R. Anderson
N. Wilkinson
J. L. Ray
by K. R. Wyman
Attorney

Patented Dec. 7, 1943

2,336,052

UNITED STATES PATENT OFFICE 2,336,052

DYNAMIC BRAKING

Harold R. Anderson, Waukesha, Nathan Wilkinson, Wauwatosa, and James L. Ray, Elm Grove, Wis., assignors to Allis-Chalmers Manufacturing Company, Milwaukee, Wis., a corporation of Delaware Application February 10, 1941, Serial No. 378,312

20 Claims. (Cl. 105—36)

This invention relates generally to the dynamic braking of a driven element and more particularly to dynamically braking an element driven by a prime mover which operates at selected and substantially constant predetermined speeds when driving said element and when idling.

The dynamic braking of prime mover driven vehicles is illustrative of one application of the invention and in this connection it has been common practice to dynamically brake vehicles employing prime mover electric drives by disconnecting the driving motor from the prime mover driven generator and then connecting the driving motor, which then functions as a generator driven from an axle of the vehicle through the usual gearing, with a suitable resistance for dissipating the electrical energy thus developed. During the operation of the driving motor as a generator, the field of the prime mover driven generator and the motive fluid for operating the prime mover are reduced to a minimum commensurate with no load or idling operation and the braking effort is varied by adjusting the field of the driving motor. This known procedure effectively brakes the vehicle, but it does not improve the efficiency of the power plant and in addition necessitates the provision of special equipment in order to provide for the dissipation of the energy developed during the braking operation.

In accordance with this invention, the energy developed during the dynamic braking of a vehicle or any other prime mover driven element is utilized to reduce the energy input to the prime mover which eliminates the provision of special energy dissipating apparatus thereby materially reducing the initial and operating costs and thereby materially increasing overall efficiency. Moreover, this invention renders practical for vehicle propulsion the use of prime movers requiring a relatively high energy input during no load or idling operation, such for example as the known types of continuous combustion gas turbine units.

An object of this invention is to provide an improved method of controlling and dynamically braking a prime mover driven element.

Another object of this invention is to provide an improved method of dynamically braking a prime mover driven element in that upon terminating the transmission of power from the prime mover to the element, power is then transmitted from the element to the prime mover and in that the energy content and/or the quantity of the motive fluid being delivered to the prime mover is decreased.

Still another object of this invention is to provide an improved method of dynamically braking a prime mover driven vehicle in that upon terminating the transmission of power from the prime mover to the vehicle traction means, power is then transmitted from the vehicle traction means to the prime mover, in that the energy content and/or the quantity of the motive fluid being delivered to the prime mover is decreased, and in that whenever the power being transmitted from the traction means to the prime mover is sufficient to cause said traction means to slip or slide, the transmission of power from the traction means to the prime mover is decreased and the energy control and/or the quantity of the motive fluid being delivered to the prime mover is increased.

Still another object of this invention is to provide an improved and novel correlation of apparatus operative to carry out the herein disclosed method of dynamically braking a prime mover driven element.

Still another object of this invention is to provide an improved and novel correlation of apparatus which inherently operates without effecting a change in the setting of the control devices to dynamically brake a prime mover driven element whenever the element exceeds the speed determined by the selective setting of the control devices.

Still another object of this invention is to provide an improved and novel correlation of apparatus operative to dynamically brake a prime mover driven element when the speed of the element is less than the speed at which it would be operated if connected to be driven by the prime mover and to use the power developed by the element during the dynamic braking operation to maintain the prime mover operating at a substantially constant predetermined speed with an abnormal reduction in the energy content and/or the quantity of motive fluid being delivered to the prime mover.

A further object of this invention is to provide improved apparatus for dynamically braking an element driven by a prime mover through an electrical and/or a hydraulic power transmitting means.

Figure 4:
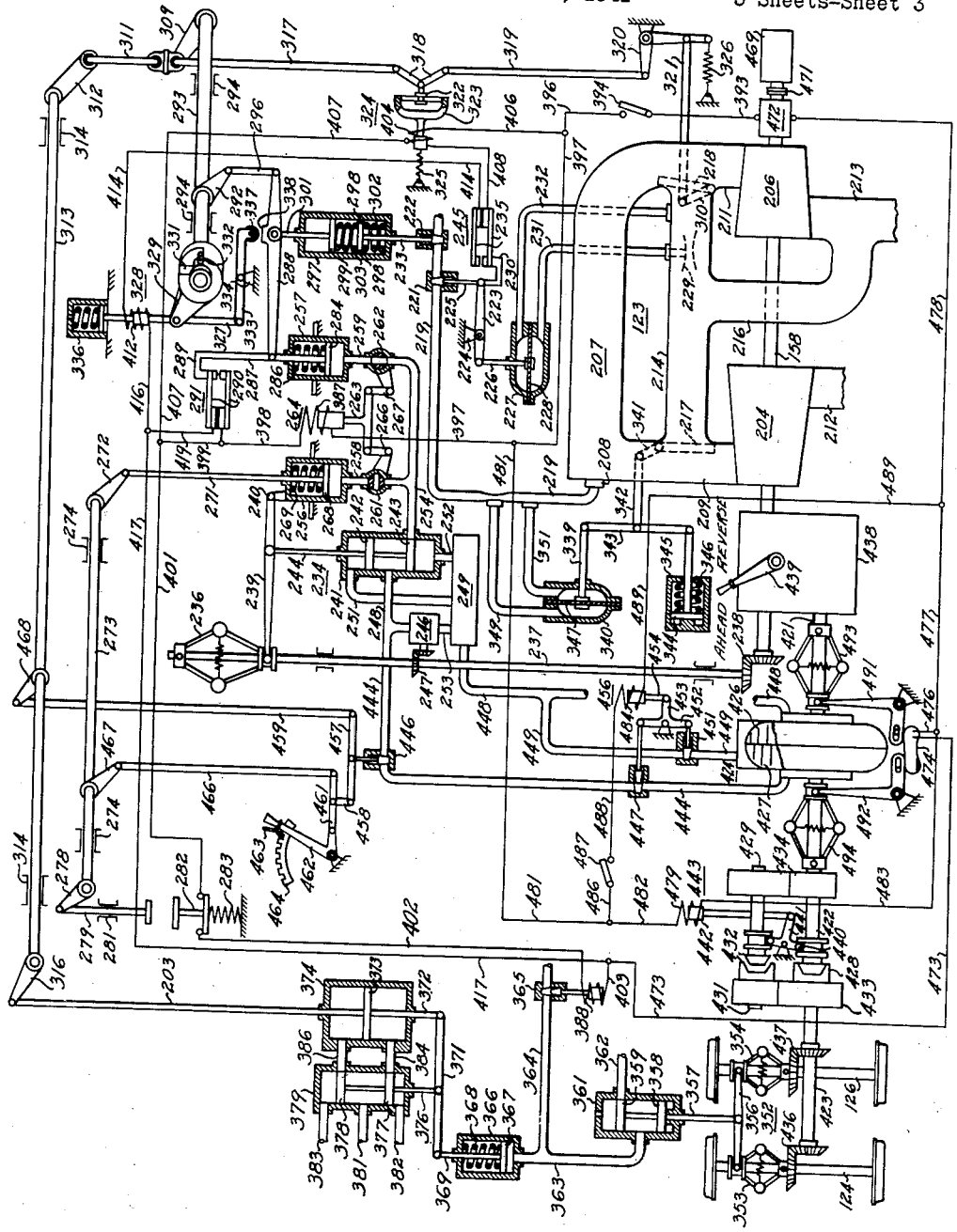

The invention accordingly consists of the various methods and of the various features of construction, combination of elements and arrangements of parts as more particularly pointed out in the appended claims and in the detailed description, in which:

Fig. 1 diagrammatically illustrates a gas turbine driven vehicle control system embodying the invention;

Fig. 2 diagrammatically illustrates a modification of the control system shown in Fig. 1;

Fig. 3 diagrammatically illustrates still another gas turbine driven vehicle control system embodying the invention; and Fig. 4 diagrammatically illustrates the control system shown in Fig. 3 applied to a gas turbine driven vehicle embodying a hydraulic power transmitting mechanism.

Referring to Fig. 1 of the drawings, it is seen that the illustrated vehicle power plant comprises a gas turbine unit 1, a pair of driving axles 2 and 3, a pair of electric driving motors 4 and 6, and a pair of electric generators 7 and 8. The axles 2 and 3 are drivingly connected with the motors 4 and 6 by means of the shafts 9 and 11 and the gearings 12 and 13, respectively. The armature of the motor 4 is electrically connected with the armature of the generator 7 by a circuit including wires 14, switch 16 and wires 17. The armature of the motor 6 is electrically connected with the armature of the generator 8 by a circuit including wires 18, contacts 19 of the double throw switch 21, and wires 22. The other contacts 23 of the switch 21 are connected by the wires 24 with the armature of a shunt wound generator 26 which is operatively connected with an internal combustion engine 27.

The generators 7 and 8 are mounted on a common shaft 28 driven by the combustion turbine unit 1, and have separately excited field windings 29 and 31, respectively. An exciter 32 which is also mounted on the shaft 28 has its armature connected in circuit with the generator field windings 29 and 31 by means of wire 33, wire 34, wire 35, resistance element 36 of the potentiometer rheostat 37, contactor element 38, conductor segments 39, wire 41, wires 42 and 43, windings 29 and 31, wires 44 and 46, wire 47, conductor segment 48, contactor 38, resistance element 49, wire 51, and wire 52. Wires 42, 43, 44 and 46 connect the field windings 29 and 31 in parallel relation with respect to each other. With the contactor 38 of the potentiometer rheostat 37 in the position shown, practically all of the resistance elements 36 and 49 are cut out of the circuit including the generator field windings 29 and 31. Movement of the actuating lever 53 for the contact 38 in a counterclockwise direction moves the contactor 38 in the same direction which increases the resistance in the generator field circuits until about half of each of the resistance elements 36 and 49 are thus cut in whereupon a further movement of the contact 38 in the same general direction first effects a reversal of the flow of current in the field winding circuits and then a decrease in the resistance in the field winding current. This result is obtained by having the resistance element 36 also connected with the wire 51 by means of the wire 54 and the resistance element 49 also connected with the wire 34 as shown.

The motors 4 and 6 have separately excited field windings 56 and 57, respectively, which are also connected in circuit with the armature of the exciter 32 and in parallel relation with respect to each other by means of wire 33, wire 58, wire 59, adjustable rheostat 61, wire 62 and wire 63, adjustable rheostat 64, wire 66, windings 56 and 57, wires 67 and 68, wire 69 and wire 52. The rheostats 61 and 64 are initially adjusted to give the separately excited motors 4 and 6 similar operating characteristics and when once adjusted are preferably retained in their adjusted positions at all times. The speed and the power developed by the driving motors are normally regulated by simultaneously varying the voltage of the respective generators which is readily accomplished by adjusting the position of the contactor 38 of the potentiometer rheostat 37. As previously indicated, the contactor 38 can be positioned to effect a reversal in the flow of current through the generator field windings 29 and 31 and since the armatures of the separately excited motors and generators are connected in circuit as previously stated, a reversal of the generator fields will reverse the direction of rotation of the driving motors.

The combustion turbine unit 1 comprises an air compressor 71, a gas turbine 72, and a combustion chamber 73 which is operatively connected with the discharge end of the compressor 71 by means of a pipe 74 and with the inlet end of the gas turbine 72 by means of the pipe 76. The air enters the compressor through a suitable inlet pipe 77 and the expanded gas is discharged from the turbine through the exhaust conduit 78. The combustion chamber is provided with a suitable burner 79 to which fuel is supplied through a conduit 81. The compressor 71 and turbine 72 are preferably axially alined and mounted on the common shaft 28. The flow of fuel to the burner is controlled by means of two valves 82 and 83 disposed in series flow relation in the conduit 81. The stem of valve 82 is operatively connected in any suitable manner, such as by means of lever 84 having a fixed fulcrum 85, with a speed regulating or governing device 86 which in turn is operatively connected with the shaft 28 by means of the shaft 87 and the gearing 88. The stem of valve 83 is operatively connected with a pressure responsive device 89 which in turn is operatively connected with the combustion chamber 73. The device 89 functions to move the valve 83 toward its closed position in the event the temperature and/or the pressure of the fluid within the combustion chamber becomes excessive. The speed responsive device 86 operates the valve 82 to increase and decrease the flow of fuel to the burner to thereby vary the energy content of the motive fluid for the turbine in accordance with changes in load in order to maintain the turbine operating at a substantially constant predetermined speed as determined by the setting of the speed responsive governor.

The operation of the combustion turbine unit 1 is initiated, assuming that the power plant has been completely shut down, by starting the internal combustion engine 27 and as soon as the generator 26 has attained its proper speed and voltage, by closing the double throw switch 21 on the contacts 23 which connect the armature of the generator 26 in circuit with the armature of the generator 8. The generator 8 which now functions as a motor, drives the compressor 71 and the turbine 72 and as soon as the turbine and compressor have attained the desired speed, usually about one-quarter normal speed is required for starting, burner operation is initiated and hot combustion gases then flow through the turbine which aids the generator 8 in driving the compressor 71. The rate of fuel feed is then increased until the combustion turbine unit is self-operating at which time the switch 21 is opened and the internal combustion starting engine is shut down. The combustion turbine unit 1 will then continue to operate at a substantially constant predetermined speed conforming with the setting of the governor 86 throughout the normal load range.

When it is desired to propel the vehicle, the contactor 38 of the potentiometer rheostat 37 is first set in neutral position, i. e., with the opposite ends of the contactor 38 engaging the midportion of resistance elements 36 and 49. The switches 16 and 21 are then closed (the double throw switch 21 must be closed on contacts 19) which connects the armatures of the generators 7 and 8 with the armatures of the driving motors 4 and 6, respectively. All that remains to be done in order to effect a movement of the vehicle in either direction is to move the handle 53 and thereby the contactor 38 of the potentiometer rheostat 37 either to the right or left from its above stated neutral position. The speed and the power developed by the driving motors when rotating in either direction are varied by moving the handle 53 to change the contactor 38 as desired.

When the vehicle is in motion and it is desired to effect dynamic braking, all that has to be done is to move the handle 53 of the potentiometer rheostat 37 in a direction to reduce speed; i. e., in the direction which introduces additional resistance in the field circuits of the generators, a sufficient distance to reduce the voltage of the generators 7 and 8 below that developed by the driving motors 4 and 6 when driven from the axles 2 and 3 through the gearings 12 and 13 and the shafts 9 and 11, respectively. Under these conditions, the driving motors 4 and 6 function as generators and the generators 7 and 8 as motors, thereby imparting to the shaft 28 the power developed by the driving motors 4 and 6 when functioning as generators. The governor 86 then functions to reduce the fuel supply to the burner below that normally required for no load or idling operation an amount commensurate with the power being transmitted to the shaft 28 by the generators 7 and 8 when operating as motors in the manner previously described. The closing movement of the governor actuated regulating valve 82 is limited to permit the burner to continue to function in a pilot capacity in the event the maximum dynamic braking effort is desired and the speed of the vehicle is sufficient to attain this result. When it is desired to terminate the dynamic braking effort, all that has to be done is to move the handle 53 of the potentiometer rheostat 37 in a direction to reduce the resistance in the field circuits of the generators until the voltage of the generators is equal to that developed by the driving motors 4 and 6, respectively, and if it is desired to again operate the motors to propel the vehicle, the movement of the handle 53 in the same direction is continued to the desired extent.

It should be particularly noted that the direction of movement of the hand lever 53 of the potentiometer rheostat 37 is the same for effecting a reduction in vehicle speed as it is for effecting a dynamic braking action and that the only difference in this respect is the degree or the extent to which the said lever is moved. Likewise, the direction of movement of lever 53 is the same for effecting a reduction in the dynamic braking action as it is for effecting an increase in vehicle speed and, it should therefore be obvious that the control of the vehicle speed and of the dynamic braking action is effected by moving a single lever in either one of two directions. Consequently, the control of the prime mover driven element (a vehicle in this case) is greatly simplified, thereby eliminating any possibility of confusion arising in this connection. In addition, it should also be particularly noted that with the hand lever 53 set in any desired running position and with the separately excited motor generator units connected as previously described, an increase in vehicle speed, i. e., the speed of the driven element, will inherently produce a reversal of current flow between the armatures of the motors and generators and an inherent braking action without necessitating any change in the setting of any of the control devices. In other words, the driving and control apparatus inherently operates without effecting a change in the setting of the control devices to dynamically brake a prime mover driven element whenever the element exceeds the maximum speed normally attained by the selective setting of the main control or hand lever 53.

The above described procedure operates to effect the desired degree of dynamic braking and at the same time materially reduces the energy content of the motive fluid for operating the prime mover, thereby materially increasing the overall efficiency of the power plant and thereby eliminating the necessity of providing special apparatus for dissipating the power developed by the driving motors when functioning as generators. In this connection, it might be well to point out that the energy consumption of a continuous combustion gas turbine unit during no load or idling operation may be in the neighborhood of from sixty to eighty percent of that consumed during full load operation and that therefore this type of prime mover or any other type of prime mover requiring a no-load energy input at least equal to a major portion of its full-load energy output capacity is capable of effectively utilizing all of the energy that can be developed during most dynamic braking operations. However, the same result is obtainable to a material degree with other forms of prime movers and the invention is not limited in its application to combustion gas turbine driven elements or vehicles.

Referring particularly to Fig. 2 in which like numerals are used to designate the same or similar parts, it is seen that the combustion gas turbine unit, the generators, the driving motors and the associated control apparatus are identical and correlated in the same manner as shown in Fig. 1 and that the only difference resides in effecting an interconnection between the contactor 38 or the potentiometer rheostat 37 and the governor 86. This is accomplished in the illustrated arrangement by means of a shaft 90 mounted for angular movement in the bearings 91 and having on one end an arm 92 which is operatively connected with the stem portion 93 of the piston 94 disposed in the cylinder 96. The piston 94, which is biased to the position shown by a spring 97, has another stem portion 98 pivotally connected with the end of the lever 84 which was connected to the fixed fulcrum 85 in the arrangement shown in Fig. 1. The other end of the shaft 90 has an arm 99 which is operatively connected with one end of a lever 101 by means of a link 102, an intermediate layer 103, and a link 104. The contactor 38 is provided with a crank arm 106 which is operatively connected with the other end of lever 101 by means of a link 107. An intermediate portion of the lever 101 is pivotally connected with a bell crank form of actuating handle 108 having a latch 109 operatively associated with a serrated quadrant 111 for retaining the handle 108 in the desired position.

The lever 103 has one end pivotally connected with the link 102, the other end pivotally connected with a spring biased fulcrum member 112, and an intermediate portion pivotally connected with the link 104. An intermediate portion of lever 103 carries a pin 105 and an elongated slot 113 formed in the armature 114 of a solenoid 116 coacts with the pin 105 to provide a lost motion connection between an intermediate portion of the lever 103 and the armature 114. Solenoid 116 is connected in circuit with excitor 32 by means of wire 33, wire 34, wire 117, switch 118, wire 119, wire 121, wire 51 and wire 52. The switch 118 which is shown in open position, is arranged so that when the handle 108 is moved to the left a sufficient distance to place the ends of the contactor 38 in the mid or neutral position with respect to the resistance elements 36 and 49, a projection 122 thereon engages and closes the switch 118 which energizes the solenoid 116 and moves the armature 114 thereof upward until the pin 105 on lever 103 engages the bottom of the slot 113. With the armature thus positioned, a downward movement of the link 102 causes the lever 103 to pivot about the armature 114 as a fulcrum point, thereby compressing the spring biased fulcrum member 112. This movement of the lever 103 effects an upward movement of the link 104 and the connected end of the lever 101. With the parts in the position shown, a movement of the handle 108 to the left causes the lever 101 to pivot about its point of connection with the link 104 which in turn effects an upward movement of link 107 and a counterclockwise movement of the contactor 38. The movement of the contactor 38 increases the resistance in the circuits including the generator field windings 29 and 31 until the maximum resistance has been inserted, whereupon a further movement in the same direction effects a reversal in the flow of current through the field windings 29 and 31 as previously described in connection with Fig. 1.

The connection between the speed responsive governor 86 and the contactor 38 of the potentiometer rheostat 37 functions when dynamically braking the vehicle to automatically effect a reduction in the power being transmitted from the traction means to the shaft 28 in the event the turbine overspeeds. When this condition occurs, the fuel regulating valve 82 is nearly closed and a further closing movement is prevented in order to maintain the burner 79 operating as a pilot burner as previously pointed out in the description of Fig. 1. Consequently, if the turbine does overspeed, the governor 86 moves the lever 84, which now pivots about its point of connection with the stem of valve 82, in a clockwise direction, thereby moving the piston 94 upward in the cylinder 96 against the action of the spring 97. An upward movement of the piston 94 effects an angular movement of the shaft 90 which in turn moves the link 102 downward. With the parts in the position shown, a downward movement of the link 102 causes the lever 103 to move in a counterclockwise direction about its points of connection with the spring biased fulcrum member 112, thereby effecting a downward movement of the link 104 and a clockwise movement of the lever 101 about its point of connection with the handle 108. This movement of lever 101 moves link 107 upward and effects a counterclockwise movement of contactor 38, which increases the resistance in the circuits including the generator field windings 29 and 31 and thereby reduces the power being transmitted from the traction means through the motors 4 and 6 and the generators 7 and 8 to the shaft 28.

When the handle 108 and the contactor 38 are positioned to propel the vehicle in the opposite direction from that effected with the parts in the position shown, the solenoid 116 is energized and the armature 114 is in its upper position with the pin 105 on lever 103 engaging the bottom of the slot 113. Consequently, if the turbine does overspeed when dynamically braking the vehicle, the link 102 will be moved downward by the action of the governor 83 as previously described and the lever 103 will pivot about the armature 114 as a fulcrum point, thereby compressing the spring biased fulcrum member 112 and effecting an upward movement of the link 104 and a counterclockwise movement of the lever 101 about its point of connection with the handle 108. Consequently, the link 107 moves downward and effects a clockwise movement of the contactor 38 which again increases the resistance in the circuits including the field windings of the generators 7 and 8 and thereby reduces the power being transmitted from the traction means to the shaft 28. Thus it is seen that the provision of the lever 103 and solenoid 116 and the correlation of the solenoid 116 with the handle 108 enables the governor 86 to automatically effect a reduction in the power being transmitted from the traction means to the shaft 28 when dynamically braking the vehicle irrespective of the direction in which the vehicle is traveling.

With the exception of the governor 86 effecting an automatic reduction in the power being transmitted from the traction means to the shaft 28 when the turbine overspeeds during the dynamic braking of the vehicle, the operation of the arrangement shown in Fig. 2 is identical to that shown in Fig. 1 and a further description in this connection is deemed unnecessary for a complete understanding of the invention. However, it should be noted that the modified arrangement of Fig. 2 inherently provides all of the advantages particularly pointed out in connection with the description of Fig. 1.

Referring particularly to Fig. 3, it is seen that the illustrated vehicle power plant comprises a combustion gas turbine unit 123, a pair of driving axles 124 and 126, a pair of driving motors 127 and 128, and an electric generator 129. The axles 124 and 126 are drivingly connected with the motors 127 and 128 by means of the shafts 131 and 132 and the gearings 133 and 134, respectively. The armatures of the motors 127 and 128 are electrically connected with the armature of the generator 129 by a circuit including wire 136, one blade of a two-pole, double-throw switch 137, contact wire, wire 139, wires 141 and 142, wires 143 and 144, wire 146, the winding 147 of a polarized relay 148, wire 149, contact 151, the other blade of the double-throw switch 137, and wire 152. The armatures of the driving motors 127 and 128 are connected in parallel relation and in this connection it is preferable to employ a suitable load equalizing control device which has been omitted in the interest of simplicity since its inclusion is not essential for a complete understanding of the invention. The other contacts 153 of the double throw switch 137 are connected by wires 154 with the armature of a shunt wound generator 156 which is operatively connected with an internal combustion engine 157.

The generator 129, which is mounted on the shaft 158 of the combustion turbine unit 123, has a separately excited field winding 159 connected in circuit with the armature of an excitor 161 which is also mounted on the shaft 158. The connecting circuit starting with the armature of the excitor includes wire 162, wire 163, wire 164, resistance element 166 of the potentiometer rheostat 165, contactor 167, conductor element 168, wire 169, field winding 159, wire 171, conductor element 172, contactor 167, resistance element 173, wire 174 and wire 176. The potentiometer rheostat 165 which is provided with an actuating handle 177 for changing the position of the contactor 167 is identical in construction and operation to that shown in Fig. 1 and a further description in this connection is deemed unnecessary.

The excitor 161 has its armature also connected in circuit with the separately excited field windings 178 and 179 of the driving motors 127 and 128, respectively, by a circuit including wire 162, wire 181, wire 182, wires 183 and 184, wires 186 and 187, wire 188, resistance element 189 of rheostat 191, contactor 192, conductor element 193, wire 194, wire 196, wire 197, and wire 176. The contactor 192 of rheostat 191 is operatively connected at a point intermediate its ends with a bell crank actuating handle 198 by means of a link 199, a lever 201 and a link 202. The end of the contactor 192 remote from the resistance element 189 is pivotally connected with a piston rod 203, thereby rendering a movement of the handle 198 operative to effect an angular movement of the contactor 192 about its point of pivotal connection with the piston rod 203. This movement of the contactor 192 either simultaneously increases or decreases, depending upon the direction of movement, the resistance in the circuit including the field windings of the driving motors 127 and 128.

The combustion turbine unit 123 comprises a compressor 204, a turbine 206 and a combustion chamber 207. The turbine and compressor are disposed in axial alinement on the common shaft 158. The combustion chamber 207 is provided with a fluid fuel burner 208 and the discharge end of the compressor is connected with the burner end of the combustion chamber by a conduit 209. The opposite end of the combustion chamber is connected with the inlet end of the turbine 206 by a conduit 211. The compressor and turbine are provided with inlet and exhaust conduits 212 and 213, respectively. A bypass conduit 214 connects the air conduit 209 with the gas conduit 211 to thereby permit compressed air discharged from the compressor to bypass the combustion chamber 207. A second bypass conduit 216 connects the turbine exhaust conduit 213 with an intermediate portion of the conduit 214 so that both compressed air and the combustion gases may bypass the turbine 206. A damper or valve 217 controls communication between the air conduit 209 and the bypass conduit 214 and a second damper or valve 218 controls communication between the gas conduit 211 and the bypass conduit 214.

Fuel is supplied to the burner 208 through a pipe 219 containing valves 221 and 222 disposed in series flow relation. The valve 221 which is normally in its fully open position, has its stem 225 pivotally connected with one end of a lever 223 which has an intermediate portion pivotally connected to a fixed fulcrum 224 and which has its other end pivotally connected with the stem 226 of a flow responsive actuator 227. The interior of the actuator 227 contains a diaphragm 228 the under side of which is subjected to the pressure on the interior of a Venturi member 229 disposed within the conduit 214 at a point intermediate its connections with the conduits 211 and 216 by a pipe 231 and the upper side of which is subjected to the pressure within the conduit 214 by a pipe 232. The valve stem 225 has a laterally extending projection 230 disposed in coacting relation with a pair of normally open resilient contact members 235 of a switch 245. Consequently, when the valve or damper 218 is open, the flow of gas through the conduits 214 and 216 will cause a greater reduction in the pressure acting on the under side of the diaphragm 228 than it will with respect to the pressure acting on the upper side thereof and as a result, the stem 226 will move downward, thereby effecting a counterclockwise movement of the lever 223 about its fulcrum 224 and a closing movement of the valve 221 and of the switch 245. Only a slight opening movement of the damper 218 will cause the actuator 227 to move the valve 221 to its minimum closed position.

The valve 222 normally regulates the fuel supply to the burner 208 so as to vary the energy content of the motive fluid flowing through the turbine in accordance with changes in load to thereby maintain the turbine operating at a predetermined constant speed throughout the normal load range, i. e., from full load to no load or idling conditions. This regulation is accomplished by operatively connecting the stem 233 of the valve 222 with a speed regulator or governor 234. The governor 234 comprises the usual flyball mechanism 236 operatively associated with a shaft 237 which is driven from the turbine shaft 158 through suitable gearing 238 and with one end of a lever 239 having its other end pivotally connected to a fixed fulcrum 240. A balanced pilot valve which is disposed within a cylinder 241, includes spaced piston portions 242 and 243 connected by a stem 244 which in turn is pivotally connected with an intermediate portion of the lever 239. Fluid under pressure from a pump 246, which is driven from the shaft 237 through the gearing 247, is delivered into the interior of the cylinder 241 at a point intermediate the spaced valve piston portions 242 and 243 through a pipe 248. The upper and lower ends of the cylinder 241 are connected to drain into a fluid reservoir 249 by means of the pipes 251 and 252, respectively. The pump 246 is also connected to draw fluid from the reservoir 249 by means of a pipe 253. The lower portion of the cylinder 241 is also provided with a fluid discharge which communicates with a pipe 254 and which is normally controlled by the lower valve piston portion 243.

With the valve in the position shown, the piston portion 243 prevents fluid from entering the pipe 254 and any fluid which leaks past the piston portions 242 and 243 is returned to the reservoir 249 through the drain pipes 251 and 252. If the turbine speed increases, the flyball mechanism 236 moves the lever 239 in a clockwise direction which moves the valve upward, thereby placing the pipe 254 in communication with the drain pipe 252. However, if the turbine speed decreases, the governor effects a downward movement of the valve from the position shown which places the pipe 254 in communication with the pipe 248 and fluid under pressure from the pump 246 flows into the pipe 254 and thence into either one or the other of the two power cylinders 256 and 257 through pipes 258 and 259, respectively. The flow of fluid under pressure into the power cylinders 256 and 257 is controlled by the valves 261 and 262 disposed in the pipes 258 and 259, respectively. The valves are connected with the armature 263 of a solenoid 264 by means of links 266 and 267, respectively, and the arrangement is such that when the solenoid is deenergized as shown, the valve 261 is closed and the valve 262 is open and that when the solenoid 264 is energized, the valve 261 is open and the valve 262 is closed.

The power cylinder 256 contains a piston 268 which is biased to the position shown by a spring 269 and which has a rod portion 271 pivotally connected with an arm 272 on the adjacent end of the shaft 273 which is mounted for angular movement in the bearings 274. The opposite end of the shaft 273 is provided with an arm 276 which is pivotally connected with a link 277 which in turn is pivotally connected with the adjacent end of lever 201. An intermediate portion of the shaft 273 is provided with an arm 278 to which is attached a rod 279 mounted for sliding movement in a guide 281. The lower end of the bar 279 is enlarged and the arrangement is such that a predetermined angular movement of the shaft 273 which is effected by an upward movement of the piston rod 271 causes the bar 279 to engage and open a switch 282 which is normally held in closed position by a spring 283.

The power cylinder 257 contains a piston 284 which is biased to the position shown by a spring 286 and which has a rod portion 287 pivotally connected with a lever 288. The rod 287 extends beyond the lever 288 and has a laterally extending portion 289 disposed in overlying relation with respect to a coacting pair of resilient contact members 290 of a normally open switch 291 so that a further downward movement of the piston 284 with respect to that shown will operate to cause said switch members to engage, thereby closing switch 291. The lever 288 has its other end connected with an arm 292 secured to a shaft 293 mounted for angular movement in the bearings 294 by means of a link 296. An intermediate portion of the lever 288 is resiliently connected with the stem 233 of valve 222 by means including a cylinder 297, having disposed therein a piston portion 298 formed on the stem 233 of valve 222 and a second piston 299 having a rod portion 301 pivotally connected with the lever 288. A relatively heavy spring 302 is disposed within the cylinder beneath the piston portion 298 and the piston 299 is separated from the piston portion 298 by a lighter spring 303. The arrangement is such that the valve stem 233 and the piston 299 normally move as a unit in either direction in response to movements of the lever 288, but that when the valve 222 is moved to its minimum closed or idling position, a further downward movement of the piston 299 can be effected by compressing the spring 303.

The shaft 293 has at one end an arm 309 which is connected by means of a flexible cable 311 with an arm 312 on one end of a shaft 313 mounted for angular movement in the bearings 314. The other end of the shaft 313 is provided with an arm 316 which is pivotally connected with the upper end of the piston rod 203. The arm 309 on the shaft 293 is also connected with an arm 310 on the damper 218 by means of a link 317, a pair of angularly disposed links 318, a link 319, a bell crank lever 320, and a link 321. The adjacent ends of the links 318 are pivotally connected together for relative angular movement on a vertically slidable member 322 carried by the armature 323 of a solenoid 324. When solenoid 324 is deenergized, its armature 323 is moved to and retained in the position shown by a spring 325. The damper 218 and the bell crank lever 320 are biased to the position shown by a spring 326. Energization of solenoid 324 moves its armature 323 to the right until the links 318 are in substantial vertical alinement with the links 317 and 319 and if link 317 is prevented from moving upward, this movement of armature 323 effects a downward movement of link 319 which is sufficient to move the damper 218 to its fully open position. The other end of the shaft 293 is provided with a lost motion connection with the armature 327 of a solenoid 328 comprising an arm 329 mounted for angular movement on the shaft 293 and having an arcuate slot 331 in which is disposed a laterally extending projection 332 on the shaft 293. The armature 327 of solenoid 328 is pivotally connected with one end of a lever 333 which is pivoted intermediate its ends to a fixed fulcrum 334. When the solenoid 328 is deenergized, the armature 327, the arm 329, and the lever 333 are biased to the positions shown by the spring 336. The end of lever 333 opposite its point of pivotal connection with armature 327 is also provided with a roller 337 disposed in overlying spaced relation with respect to a roller engaging surface 338 on the lever 288.

The damper 217 is operatively connected with the stem 339 of a flow responsive actuator 340 by means of arm 341, a link 342 and a lever 343 having one end pivotally connected with a piston 344 which is disposed in a cylinder 345 and which is biased to the position shown by a spring 346 and having its other end pivotally connected with the stem 339. The stem 339 is connected with a diaphragm 347 which on one side is subjected to the pressure in a venturi 348 in the fuel supply pipe 219 by means of a pipe 349 and which on its other side is subjected to the normal pressure within the fuel supply pipe 219 by means of a pipe 351. The arrangement is such that during variations in the rate of fuel supply to the burner as effected by movements of the regulating valve 222, the damper 217 remains closed and that when the fuel regulating valve 222 is in its minimum closed or idling position, a further reduction in the rate of fuel supply to the burner, which is caused by a closing movement of the valve 221 as previously described, effects a predetermined opening movement of the air bypass damper 217.

The driving axles 124 and 126 are operatively connected with a differential speed responsive device 352 by means of the shafts 131 and 132 and the gearings 133 and 134, respectively. The device 352 comprises a pair of flyball mechanisms 353 and 354 interconnected by a lever 356 having its mid-portion pivotally connected with the stem 357 of a pilot valve structure having spaced piston portions 358 and 359 disposed within a cylinder 361. The flow of a fluid, preferably a liquid under pressure from a suitable source (not shown), through the pipe 362 into the cylinder 361 is controlled by the piston portion 359. The arrangement is such that when the vehicle speed is zero or less than a predetermined minimum, the pilot valve is in its uppermost position, thereby placing the fluid inlet pipe 362 in communication with a pipe 363 which in turn is connected with a drain pipe 364 preferably arranged to return the fluid to the source of supply (not shown) and that when the speed of the vehicle exceeds the predetermined minimum, the valve is in the position shown which prevents the admission of fluid under pressure into the cylinder. The pipe 364 is provided with a solenoid actuated valve 365 which is closed when the solenoid is energized. When the vehicle is traveling, the pilot valve normally remains in the position shown, but in the event there is a difference in axle speed which may be produced by the slipping or sliding action of the drive wheels, the flyball mechanism on the axle rotating at the lesser speed will effect an angular movement of the lever 356 about its point of pivotal connection with the other flyball mechanism and an upward movement of the pilot valve, thereby placing the fluid inlet pipe 362 in communication with the pipe 363.

The pipe 363 also communicates with a power cylinder 366 containing a piston 367 which is biased to the position shown by a spring 368. The piston 367 has a rod portion 369 which is pivotally connected with one end of a lever 371 having its other end pivotally connected with the rod portion 372 of a second double acting power piston 373 disposed within a cylinder 374. An intermediate portion of the lever 371 is pivotally connected with the stem 376 of a balanced pilot valve structure comprising spaced piston portions 377 and 378 disposed within a cylinder 379. Fluid under pressure from a suitable source (not shown) is admitted into the cylinder 379 between the piston portions 377 and 378 through a pipe 381, and the ends of the cylinder are provided with drain pipes 382 and 383 which are preferably arranged to return the fluid to the source of supply. The valve piston portions 377 and 378 control pipe connections 384 and 386, respectively, arranged to place the interior of cylinder 379 in communication with the interior of the cylinder 374 on opposite sides of the piston 373. With the parts in the position shown and the solenoid actuated drain valve 365 closed, the admission of fluid under pressure to the cylinder 366 causes the piston 367 therein to move upward against the action of the spring 368 and effect a counterclockwise movement of the lever 371 about its point of pivotal connection with the rod portion 372 of piston 373. This movement of lever 371 effects an upward movement of the valve piston portions 377 and 378 which places pipe 381 in communication with pipe 386, thereby subjecting the upper side of piston 373 to the fluid under pressure and which places pipe 384 in communication with the drain pipe 382. Piston 373 and its rod portions 203 and 372 thereupon move downward and effect a return of the balanced pilot valve structure to its neutral position, i. e., with the pipes 384 and 386 closed, an angular movement of the contactor 192 of rheostat 191 about its point of pivotal connection with link 202 and an angular movement of shaft 313. If the supply of fluid under pressure to the cylinder 366 is terminated, the pistons 367 and 373 remain in the positions to which they have been moved as above described until the solenoid actuated drain valve 365 is opened. If fluid under pressure is again admitted to the cylinder 366 before the drain valve 365 is opened, the pistons 367, 373 and the associated apparatus will again be moved in the manner just described without first having returned to the positions shown.

The winding 387 of the solenoid 264 for actuating the valves 261 and 262 of the governor 234 and the winding 388 of the solenoid actuated drain valve 365 are electrically connected with the armature of the exciter 161 by a circuit starting from one side of the exciter and comprising wire 162, wire 181, wire 389, the armature 391 of the polarized relay 148, contact 392, wire 393, manual switch 394, wire 396, wire 397, winding 387, wire 398, wire 399, wire 401, switch 282, wire 402, winding 388, wire 403, wire 197, and wire 176 back to the other side of the exciter. The winding 404 of the damper solenoid 324 is connected in parallel relation with respect to the winding 387 of solenoid 264 and in series relation with respect to the winding 388 of the solenoid actuated drain valve 365 by a circuit starting from the junction of wires 396 and 397 and comprising wire 406, winding 404, and wire 407 to the junction of wires 399 and 401. The winding 412 of the solenoid 328 is connected in parallel relation with respect to the winding 387 of solenoid 264 and with respect to the winding 388 of the solenoid actuated valve 365 and in series relation with the winding 404 of solenoid 324 by a circuit starting with the junction of wires 396 and 397 and comprising wire 406, winding 404, wire 408, switch 245, wire 414, winding 412, wire 416, wire 417, and wire 196 to the junction of wires 197 and 403. A circuit for connecting the winding 387 of solenoid 264 in parallel with the switch 282 and the winding 388 of the solenoid actuated valve 365 is also provided, which comprises, starting from the junction of wires 398 and 399, wire 418, switch 291, and wire 419 to the junction of wires 416 and 417.

The operation of the combustion turbine unit 123 is initiated, assuming the various parts are in the position shown, by starting the internal combustion engine 157 and when the connected generator 156 has attained the desired speed and voltage, by closing the two-pole double-throw switch 137 on contacts 153 which connects the armature of generator 156 with the armature of generator 129 which now functions as a motor and drives the shaft 158 on which is mounted the gas turbine 206 and the compressor 204. The speed of shaft 158 is increased by adjusting the potentiometer rheostat 165, and when the turbine and compressor unit is operating at about one-quarter normal idling or no load speed, fuel is supplied to the burner 208 and hot combustion gases pass through the turbine which tends to increase its speed. The fuel supply is then increased until the combustion turbine unit 123 is operating at its normal no load or idling speed, whereupon the switch 137 is opened and the operation of the internal combustion engine 157 and generator 156 is terminated.

The vehicle can now be propelled in either direction desired, assuming the contactor 167 of the potentiometer rheostat 165 is in its neutral position, i. e., with its opposite ends midway between the ends of the resistance elements 166 and 173, merely by closing the two-pole, double-throw switch 137 on contacts 138 and 151 which connects the armatures of the driving motors 127 and 128 with the armature of the generator 129 and by moving the handle 177 of rheostat 165 in the necessary direction. The speed of the vehicle may be varied simply by changing the position of the contactor 167 of rheostat 165 and, if desired, also by varying the position of the contactor 192 of rheostat 191. During normal operation, it is preferable to maintain the contactor 192 of rheostat 191 in a predetermined position intermediate the ends of the resistance element 189 and to effect the necessary variation in speed and power simply by moving the handle 177 to vary the position of the contactor 167 of rheostat 165. The direction in which the vehicle is traveling may be readily reversed by moving the handle 177 in a direction to increase resistance in the field circuit of the generator until the contactor passes through its neutral position. The operation in this respect is identical to that set forth in connection with the descriptions of Figs. 1 and 2. As the load on the turbine varies throughout the normal operating range, i. e., from no load to full load, the governor operates to place the power cylinder 257 in communication with the source of fluid under pressure or with the drain, thereby effecting the necessary movement of the lever 288 and valve 222 to vary the fuel supply so as to maintain the turbine and compressor operating at the selected predetermind speed. For example, if the load increases sufficiently so that the speed tends to decrease, the flyball mechanism 236 moves lever 239 in a counterclockwise direction about its fixed fulcrum 240 which in turn moves the connected pilot valve downward and places the source of fluid under pressure in communication with the interior of power cylinder 257. The piston 284 thereupon moves upward and effects a clockwise movement of lever 288 about its point of connection with link 296 which permits the spring 302 to effect an upward or opening movement of the valve 222. If the turbine speed increases, the various parts are moved in opposite directions from those just specified and the result is a closing movement of the valve 222.

Assuming that the vehicle is being propelled by the power plant as just described and that it becomes necessary or desirable to dynamically brake the vehicle, all that has to be done, assuming further that the manual switch 394 is closed, is to move handle 177 and thereby contactor 167 in a direction to decrease the voltage of the generator 129 until the generator functions as a motor to drive the shaft 158 and the driving motors 127 and 128 function as generators being driven from the axles 124 and 126 through the shafts 131 and 132 and the gearings 133 and 134, respectively. This procedure effects a reversal of the flow of current between the armatures of the driving motors 127 and 128 and the armature of the generator 129 and results in the governor 234 moving the fuel valve 222 to its minimum closed or idling position since the power output of the turbine 206 has been reduced to a minimum. The reversal of current in the winding 147 of the polarized relay 148 causes its armature 391 to engage contact 392, thereby energizing a circuit starting from one side of the exciter 161 and comprising wire 162, wire 181, wire 369, armature 391, contact 392, wire 393, manual switch 394, wire 396, parallel portions consisting of (1) wire 397, winding 387 of solenoid 264, wire 398 and wire 399 and (2) wire 406, winding 404 of solenoid 324, and wire 407, wire 401, switch 282, wire 402, winding 388 of the solenoid actuated valve 365, wire 403, wire 197, and wire 176 back to the other side of the exciter.

Energization of solenoid 264 closes valve 262 and opens valve 261, thereby rendering the piston 268 in power cylinder 256 operative and the piston 284 in the power cylinder 257 inoperative, respectively, in response to the movements of the governor actuated pilot valve structure disposed in the cylinder 241. Energization of solenoid 324 moves its armature 323 to the right, which moves the links 318 into substantial vertical alinement with respect to each other and with respect to the links 317 and 319, opens the gas bypass damper 218, thereby permitting all of the combustion gases to bypass the turbine 206. No angular movement is imparted to the shaft 293 by the movement of the armature 323 and the links 318 since the laterally extending projection 332 thereon engages the lower end of the slot 331 in the arm 329 as shown. Energization of the winding 388 of the solenoid actuated drain valve 365 moves the valve to its fully closed position.

The flow of all of the combustion gases through the bypass conduits 214 and 216 causes the flow responsive actuator 227 to move the valve 221 to its minimum closed position and the initial movement of the valve 221 in this direction causes its stem 225 to close the resilient contacts 235 of switch 245. The further reduction in the flow of fuel to the burner 208 causes the actuator 340 to move the air bypass damper 217 towards fully open position, and as a result a portion of the air discharged from the compressor 204 flows through bypass conduits 214 and 216, thereby bypassing both the combustion chamber 207 and the turbine 206. The burner 208 is now functioning in a pilot capacity, and the energy being consumed and the power being developed by the combustion turbine unit is reduced to a minimum commensurate with conditions which will permit the combustion gas turbine unit to be quickly operated in a power generating capacity for propelling the vehicle when such operation is desired.

Closure of switch 245 energizes a parallel circuit starting from the winding 404 of solenoid 324 and comprising wire 408, switch 245, wire 414, winding 412 of solenoid 328, wire 416, wire 417 and wire 196 to the junction of wires 403 and 197. Energization of solenoid 328 moves its armature 327 upward, thereby effecting (1) a sufficient clockwise movement of the arm 329 on the shaft 293 to bring the opposite face of the arcuate slot 331 into engagement with the projection 332 on the shaft 293 and (2) a sufficient clockwise movement of the lever 333 about its fulcrum 334 to bring the roller 337 carried thereby into engagement with the roller engaging surface 338 on the lever 288. Shaft 293 can now be moved in a clockwise direction until the projection 332 thereon again engages the opposite face of the arcuate slot 331, i. e., the same face which it is shown as engaging in the drawings.

When the various parts are in the positions just described, the air bypass damper 217 is partially opened, the gas bypass damper 218 is fully opened, the fuel supply has been reduced to a minimum, the governor power piston 284 is inoperative, the governor power piston 268 is operative and the driving motors 127 and 128 are functioning as generators and the generator 129 as a motor to drive the shaft 158 and the compressor 204 and the turbine 206 mounted thereon. The power being transmitted from the traction means to the shaft 158 is varied by the governor controlled power piston 268 to maintain the combustion turbine unit operating at a substantially constant predetermined speed. For example, if the speed of the shaft 158 increases, which indicates that too much power is being transmitted from the traction means, the flyball mechanism 236 moves the pilot valve piston portions 242 and 243 upward in cylinder 241 which places power cylinder 256 in communication with the drain pipe 252, and as a result, the power piston 268 is moved downward by the spring 269 which in turn effects an angular movement of shaft 273 in a direction causing the contactor 192 of rheostat 191 to move in a clockwise direction, thereby introducing additional resistance in the field circuits of the driving motors 127 and 128 which decreases the power being transmitted to the shaft 158. If, however, the speed of the shaft 158 tends to decrease, the governor power piston 268 is moved in the opposite direction, i. e., upward, and as a result the resistance in the field circuits of the driving motors 127 and 128 is decreased, thereby increasing the power being transmitted to the shaft 158.

When the dynamic braking effort is sufficient to effect a reduction in vehicle speed, the governor power piston gradually moves the contactor 192 of rheostat 191 until substantially all of resistance element 189 has been cut out of the field circuits of motors 127 and 128. When this condition occurs, a further reduction in vehicle speed would produce a corresponding reduction in the speed of shaft 158. However, a reduction in the speed of shaft 158 is prevented due to the fact that simultaneously with the cutting out of all of resistance element 189, the arm 278 on shaft 273 has caused rod 279 to open switch 282 which opens the circuit including the winding 387 of solenoid 264 and the winding 388 of the solenoid actuated drain valve 365. The deenergization of winding 388 opens the drain valve 365 and the deenergization of winding 387 closes valve 261 and opens valve 262, thereby rendering the governor controlled power pistons 268 and 284 inoperative and operative, respectively. Consequently, if the speed of shaft 158 now tends to decrease, the governor power piston 284 will move upward, thereby effecting a clockwise movement of lever 288 about its point of pivotal connection with the rod portion 301 of piston 299 (this fulcrum for lever 288 was established by the previously described movement of lever 333 which caused the roller 337 to engage the surface 338 on lever 288). This movement of lever 288 effects a clockwise movement of shaft 293 which in turn moves the link 317 attached to arm 309 upward and, since the links 318 are in substantial vertical alinement as previously described, an upward movement of link 317 effects an upward movement of link 319 which moves the gas bypass damper 218 toward its closed position shown. Combustion gases now flow through the turbine 206 which develops power to aid the driving motors 127 and 128, which are still functioning as generators, in maintaining the speed of shaft 158 substantially constant. This procedure continues as the vehicle speed decreases until the gas bypass damper 218 is closed or nearly closed whereupon the gas flow responsive actuator 227 fully opens the valve 221 to increase the flow of fuel to the burner 208 to the quantity commensurate with no load or idling operation as determined by the minimum closed position of valve 222. This movement of the valve 221 releases the resilient contact members 235 of switch 245 which immediately opens and deenergizes the winding 404 of solenoid 324 and the winding 412 of solenoid 328. Deenergization of solenoid 328 moves its armature 327, the arm 329 on shaft 293, the shaft 293, and the lever 333 to the positions shown. This movement of armature 327 effects a return of the shaft 293 to the position shown since the projection 332 thereon was positioned immediately adjacent the surface shown by the angular movement imparted to the shaft 293 by the lever 288 in effecting a closure of the gas bypass damper 218. Deenergization of solenoid 324 permits spring 325 to move its armature to the position shown and since the shaft 293 effected an upward movement of link 317, the links 318 and the member 322 to which the links 318 are pivoted will be returned to the positions shown. This increase in the flow of fuel to the burner causes the fuel flow responsive actuator 340 to effect an immediate closure of the air bypass damper 217.

The combustion turbine unit is now operating under normal no load or idling conditions and if the vehicle is to be brought to a complete stop the usual air or mechanical brakes (not shown) may be applied. When during the preceding operation just described, the driving motors 127 and 128 cease functioning as generators, the current flowing between the armatures of the driving motors and the armature of the generator 129, which then commences to function as a generator, reverses, which causes the armature 381 of the polarized relay 148 to move to the position shown thereby opening all of the braking control circuits. All braking control apparatus with the exception of the governor controlled power piston 268, which is held in its uppermost position by the fluid retained in the cylinder 256 when the valve 261 was closed, and with the exception of switch 282, which is held open by the position of the piston 268 are now in the position shown and if the contactors 192 and 167 of rheostats 191 and 165 have not already been returned to their normal and neutral positions, respectively, such adjustment is effected by moving the handles 198 and 177. All that has to be done when it is desired to again propel the vehicle in either direction is to effect the necessary movement of the handle 177 and thereby the contactor 167 of the potentiometer rheostat 165 as previously described.

If when dynamically braking the vehicle as previously described, i. e., with the winding of the solenoid actuated valve 365 and the windings of solenoids 264, 324 and 328 energized, the power being developed by the driving motors 127 and 128 is sufficient to cause one of the traction means to slip or slide, the differential speed responsive device 352 moves the pilot valve piston portions 358 and 359 upward thereby admitting fluid under pressure to the pipe 363 and since the solenoid actuated drain valve 365 is closed (its winding 388 remains energized until either all braking control circuits are deenergized or the switch 282 is opened), power piston 367 moves upward in cylinder 366 thereby effecting an upward movement of the balanced pilot valve structure disposed in cylinder 379 and a downward movement of power piston 373 until the pilot valve structure is returned to its neutral position shown. This downward movement of piston 373 effects simultaneous angular movements of the shaft 313 and of the contactor 192 of rheostat 191 in directions operative to effect a closing movement of the gas bypass damper 218 and an increase in the resistance in the field circuits of the motors 127 and 128. The resultant angular movement of shaft 313 effects an upward movement of link 317 which is attached to the shaft arm 312 by means of the flexible cable 311. The upward movement of link 317 which is also attached to the arm 309 on shaft 293, effects an angular movement of shaft 293 which movement is permitted by the arcuate slot 331 in the arm 329 as previously described. This operation automatically and simultaneously decreases the power being transmitted from the traction means to the shaft 158 and increases or initiates the development of power by the turbine 206. If the traction means continues to slide or slip, the power being transmitted and developed is further decreased and increased, respectively, as just described. Further decreases and increases are permitted due to the fact that the drain valve 365 remains closed and that each time the differential speed responsive device operates to admit fluid under pressure to the pipe 363, the power piston 367 is moved upward further into the cylinder 366.

If when dynamically braking the vehicle with the turbine 206 developing some power, i. e., with the gas bypass damper 218 under the control of the governor power piston 284 and only partially closed, a down grade is encountered which causes the vehicle speed to increase, the governor power piston 284 will move downward thereby effecting an angular movement of lever 288 and shaft 293 operative to move the damper 218 to its fully open position. If when the damper 218 is in its fully open position, the speed of the vehicle continues to increase, a further downward movement of the power piston 284 will cause the projection 289 on its rod portion 287 to close switch 291 thereby closing a circuit around switch 282 which includes winding 387 of solenoid 264. Energization of solenoid 264 opens valve 261 and closes valve 262 thereby again rendering the governor controlled power pistons 268 and 284 operative and inoperative, respectively. Consequently, the gas turbine 206 is not developing power and all the power required to maintain the turbine and compressor operating at the predetermined constant speed is derived from the traction means and is being transmitted to the shaft 158 through the motors 127 and 128 and the generator 129. The maximum dynamic braking effort is now being utilized to retard the speed of the vehicle and if the vehicle speed continues to increase, the usual air or mechanical brakes (not shown) will have to be applied if a reduction in vehicle speed is desired. From this point on, the dynamic braking of the vehicle will continue as previously described or it may be discontinued at any time simply by opening the manual switch 394.

The system shown in Fig. 3 inherently affords all of the advantages present in the arrangements shown in Figs. 1 and 2 and numerous additional advantages, namely: (1) a greater degree of economy since when dynamically braking the vehicle, a large portion of the air discharged from the compressor bypasses both the combustion chamber and the turbine thereby permitting a much greater reduction in the quantity of fuel supplied to the burner than is possible with the previously described arrangements; (2) a greater dynamic braking effort can be obtained since when the vehicle speed is sufficient the gas bypass damper is fully open and no power is developed by the turbine; (3) dynamic braking is possible at much lower speeds since both the quantity and the energy content of the combustion gases are materially reduced with respect to the combustion gases employed in the previously described arrangements; (4) the highest permissible degree of dynamic braking is automatically attained at all times; and (5) slipping and/or sliding of the traction means is materially reduced if not entirely eliminated.

The arrangement shown in Fig. 4 differs from that shown in Fig. 3 in that a hydraulic instead of an electrical power transmission means is employed. However, the combustion turbine unit, the control apparatus associated therewith and the differential speed control are identical in their arrangement and operation to those described in Fig. 3 and the same reference numerals are used to designate the same or similar parts. In this arrangement the power transmission means comprises three axially alined shafts 421, 422 and 423, a hydraulic power transmitting unit 424 including a driving element 426 mounted on an end portion of shaft 421 and a driven element 427 mounted on the adjacent end portion of shaft 422, a clutch 428 adapted to connect the adjacent end portions of the shafts 422 and 423, a pair of axially alined lay shafts 429 and 431, a clutch 432 adapted to connect the adjacent ends of the lay shafts 429 and 431, gearing 433 connecting lay shaft 431 with shaft 423, gearing 434 connecting lay shaft 429 with shaft 422, gearings 436 and 437 connecting shaft 423 with axles 124 and 126, respectively, and reversing gearing 438, the details of which are not shown and which may be of any desired type operatively connecting shaft 421 with shaft 158. A selector handle 439 determines the direction of rotation of the driven shaft. During normal opration, i. e., when the vehicle is being propelled by the combustion turbine unit 123, the clutch 428 connects the shafts 422 and 423 and the clutch 432 is disengaged and the drive is from shaft 158 through the gearing 438, shaft 421, hydraulic unit 424, shaft 422, clutch 428, shaft 423, and gearings 436 and 437 to the axles 124 and 126, respectively.

During normal operation, the speed of the driving element 426 exceeds the speed of the driven element 427 and unless the vehicle is on a down grade this condition prevails when the energy content and/or the quantity of the motive fluid for operating the turbine or other type of prime mover is reduced to a minimum commensurate with no load or idling operation preparatory to bringing the vehicle to a stop. Consequently, in order to effect a transmission of power from the traction means to the prime mover for dynamically braking the vehicle under such conditions, it is necessary to provide means for causing the speed of the element normally termed the driven element to materially exceed the speed of the element normally termed the driving element. This result is accomplished in the illustrated arrangement by means of the lay shafts 429 and 431, the clutches 428 and 432, and the gearings 433 and 434. The clutches 428 and 432 are arranged for alternative engagement with their respective shafts, i. e., when the clutch 428 engaged to connect the shafts 422 and 423 the clutch 432 is disengaged and vice versa, by means of a clutch shifting lever 440 having its opposite ends connected with the shiftable elments of the clutches 428 and 432 and having an arm 441 operatively connected with the armature 442 of a solenoid 443. The arrangement is such that when the solenoid is deenergized its armature 442, the clutch shifting lever 440, and the clutches 428 and 432 are in the positions shown, i. e., clutch 428 is engaged and clutch 432 is disengaged. Energization of solenoid 443 disengages clutch 428 and engages clutch 432. It should be noted that the gearings 433 and 434 operate when the clutch 432 is engaged to effect a material increase in the speed of the driven element 427 with respect to the speed at which it was being driven when the clutch 428 was engaged.

A suitable fluid under pressure is delivered from the pump 246 to the interior of the hydraulic unit 424 through a pipe 444 containing a regulating valve 446 and a normally open shutoff valve 447. Fluid is normally discharged from the hydraulic unit 424 through a pipe 448 which is connected with the reservoir 249. The power being transmitted through the hydraulic unit can be readily varied by regulating the quantity of fluid in the hydraulic unit simply by changing the position of the valve 446. The hydraulic unit can also be emptied of fluid by closing the regulating valve 446, but this procedure is rather slow and should be avoided in arrangements which would necessitate connecting the regulating valve with a plurality of separate regulating or governing mechanisms. Consequently, it is preferable to provide a separate means operable to suddenly empty the hydraulic unit of fluid which may comprise a pipe 449 which is connected with the pipe 448 and which contains a normally closed valve 451 adapted to be suddenly opened simultaneously with the closing of the shutoff valve 447. The sudden and simultaneous operation of the valves 447 and 451 is accomplished by means of a fulcrumed lever 452 having opposite ends connected with the stems of valves 447 and 451 and having an arm 453 operatively connected with the armature 454 of a solenoid 456. When the solenoid is deenergized, its armature 454, lever 452 and the valves 447 and 451 are in the position shown, i. e., valve 447 is fully open and valve 451 is closed. Energization of solenoid 456 closes valve 447 and fully opens valve 451. The control of a hydraulic power transmission unit in the manner just described is old and well known in the art and a further detailed description in this connection is unnecessary for a complete understanding of the invention.

The regulation of the power being transmitted from the driving element 426 to the driven element 427 is accomplished in the illustrated arrangement by changing the position of the regulating valve 446 either manually or automatically. The mechanism for varying the position of the valve 446 comprises a lever 457 having an intermediate portion operatively connected with the stem of valve 446 and having its opposite ends pivotally connected with the links 458 and 459. Link 458 is operatively connected with an intermediate portion of a lever 461 having one end pivotally connected with a bell crank lever including a handle portion 462 provided with a latch member 463 which is operatively associated with a serrated quadrant 464. The other end of lever 461 is pivotally connected with a link 466 which in turn is pivotally connected with an arm 467 on the shaft 273. The link 459 is pivotally connected with an arm 468 on the shaft 313. Consequently, it should be obvious that an opening and closing movement of the valve 446 can be effected (1) by the movement of the lever 462, (2) by the angular movement of shaft 273 which is effected by the governor controlled power piston 268 as described in connection with Fig. 3, and (3) by an angular movement of shaft 313 which is effected by the movement of the power piston 373 in cylinder 374. The movement of piston 373 is controlled by the differential speed responsive device 352 and the associated apparatus as specifically set forth in the description of Fig. 3.

The combustion turbine unit 123 is started by coupling an internal combustion engine 469 to the shaft 158 in any suitable manner such as by a clutch 471. The procedure is to first start the internal combustion engine and when the engine is operating satisfactorily, to then connect the engine with the shaft 158 and when the turbine unit is operating at the necessary predetermined speed, initiate burner operation and then proceed as described in connection with Fig. 3 until the combustion turbine unit is operating under its own power whereupon the clutch 471 is disengaged and the operation of the internal combustion engine 469 is terminated. The fuel supply to the burner 208 is thereafter controlled by the governor 234 which varies the position of the fuel regulating valve 222 in accordance with changes in load so as to maintain the turbine and compressor operating at a substantially constant predetermined speed throughout the normal load range. The apparatus for accomplishing this automatic regulation and its operation is identical to that described in connection with Fig. 3 and a further description in this respect is deemed unnecessary. The power plant is now in condition to propel the vehicle in either direction, depending upon the position of the selector handle 439, and all that remains to be done when the various parts are in the position shown is to move the lever 462 toward the left which opens valve 446 and admits fluid into the hydraulic unit 424. The power transmitted and the speed of the driven element 427 may be regulated by varying the position of the valve 446 as desired.

The power for the electrical control circuits in this arrangement is provided by a generator 472 mounted on the turbine end of the shaft 158 and one terminal of this generator is directly connected to the wire 393 instead of being indirectly connected thereto by means of wires 162, 181, 389, armature 391 and the contact 392 of the polarized relay 148 as shown in Fig. 3. The other terminal of generator 472 is connected with the junction of wires 417 and 403, which corresponds to the junction of wires 196 and 403 in Fig. 3, by means starting from said junction and comprising wire 473, tiltable mercury switch 474, wire 476, wire 477, and wire 478. The various circuits including the winding of the solenoid actuated valve 365, the windings of solenoids 264, 324 and 328, and the switches 282, 291, and 245, which circuits are connected between the junction of wires 396 and 397, and the junction of wires 403 and 417 are arranged and controlled in the identical manner as the circuits including the corresponding elements in Fig. 3 and a further description in this respect would be mere surplusage.

The winding 479 of the clutch solenoid 443 is connected in parallel with the various circuits above mentioned by a circuit starting from wire 397 and comprising wire 481, wire 482, winding 479 and wire 483 to the junction of wires 476 and 477. The winding 484 of the valve solenoid 456 is connected in parallel with the winding 479 of solenoid 443 by a circuit starting with the junction of wires 481 and 482 and comprising wire 486, the normally open manual switch 487, wire 488, winding 484, and wire 489 to the junction of wires 477 and 478. The mercury switch 474 is mounted for tilting movement with respect to the adjacent arms of a pair of bell crank levers 491 and 492. Lever 491 has its other arm connected with an actuating flyball mechanism 493 operatively associated with shaft 421, and lever 492 has its other arm connected with an actuating flyball mechanism 494 operatively associated with the shaft 422. The arrangement is such that whenever the speed of the shaft 421 is greater than the speed of the shaft 422 the switch 474 is tilted to its open position shown and that whenever the speed of the shaft 422 exceeds the speed of the shaft 421, the switch 474 is tilted to its closed position.

Assuming that the vehicle is being propelled by the prime mover at normal speed in the ahead direction as indicated by the position of the selector handle 439 of the reversing gearing 438 and that it is desired to bring the vehicle to a stop, dynamic braking may be employed to aid in stopping the vehicle simply by closing manual switch 394 which energizes the circuit including winding 479 of clutch solenoid 443, and as a result the clutches 432 and 428 are immediately engaged and disengaged, respectively, thereby connecting shaft 422 with shaft 423 through the gearing 434, lay shaft 429, clutch 432, lay shaft 431 and gearing 433. This connection between the shafts 422 and 423 materially increases the speed of shaft 422 relative to the speed of shaft 421 which effects a reversal in the transmission of power between the prime mover and the traction means, i. e., power is now being transmitted from the traction means to the prime mover, and a tilting movement of switch 474 to its closed position. However, before the reversal in the direction of power transmission is actually effected, the power being transmitted from the prime mover to the driving axles becomes zero which means that the load on the prime mover has been entirely removed and as a result the shaft 158 tends to overspeed which causes the governor 234 to move the fuel regulating valve 222 to its minimum closed or idling position. Consequently, when the switch 474 actually closes, the position of the governor controlled power piston 284, the lever 288 and valve 222 are positioned substantially as shown.

Closure of switch 474, which controls and energizes the same circuits as does the polarized relay 148 in Fig. 3, simultaneously energizes the governor valve solenoid 264 and the damper solenoid 324 and as a result the governor power pistons 268 and 284 are rendered operative and inoperative, respectively, and the gas bypass damper 218 is moved to its fully open position. The opening of the gas bypass damper 218 causes the flow responsive actuator 227 to move valve 221 to its minimum closed position which in turn closes switch 245, thereby energizing solenoid 328 which moves the arm 329 on shaft 293 and the lever 333 in exactly the same manner as described in connection with Fig. 3. The further reduction in the flow of fuel produced by the closing movement of valve 221 also causes the actuator 340 to partially open the air bypass damper 217. The combustion turbine unit 123 and its control apparatus function exactly in the same manner as specifically set forth in the description of Fig. 3 and the only difference is that the governor controlled power piston 268 varies the position of the regulating valve 446 instead of the contactor 192 of rheostat 191. Under these conditions, a large portion of the air discharged from the compressor bypasses both the combustion chamber and the turbine, the fuel supply has been reduced to a minimum commensurate with the operation of the burner in a pilot capacity, all of the combustion gases bypass the turbine and therefore the turbine develops no power, and the speed of the turbine and compressor are maintained substantially constant by the transmission of power from the traction means to the shaft 158. If the speed of the shaft 158 tends to decrease, the governor power piston 268 acts to more fully open the valve 446 and if the speed increases, the valve is moved toward its closed position.

When the speed of the vehicle has decreased so that the power transmitted from the traction means is insufficient to maintain the shaft 158 operating at the desired speed, the turbine is rendered operative to develop power and the power developed by the turbine is increased in accordance with the decrease in the power being transmitted from the traction means until the turbine is again operating under normal no load or idling conditions. This procedure is also accomplished in exactly the same manner and by the same apparatus disclosed with respect to Fig. 3 and a more detailed description in this connection is deemed unnecessary. At the time or immediately before the turbine is operating under normal no load or idling conditions, the manual switch 487 is closed which immediately empties the hydraulic unit 424, thereby preventing any further transmission of power between the elements 426 and 427, and if the usual air or mechanical brakes (not shown) have not already been applied, they are applied at this time to bring the vehicle to a complete stop. At the time the hydraulic unit is emptied and possibly slightly before that time, the speed of the shaft 421 will equal or exceed the speed of the shaft 422 which causes a tilting movement of the switch 474 to its open position, thereby deenergizing all braking control circuits with the exception of the circuits including the clutch and valve solenoids 443 and 456, respectively, and returning all parts, with the exception of the governor power piston 268 which remains in its uppermost position due to the closure of valve 261 and of the switch 282 which is held open by the position of piston 268, to the positions shown. The valve 446 is now moved to its fully closed position by hand lever 462 and the switches 394 and 487 are opened. The power plant is now in condition for propelling the vehicle in either direction merely by setting the selector handle 439 and by opening the valve 446 as previously described.

If, when dynamically braking the vehicle with the gas bypass damper partially closed, a down grade is encountered which causes the speed of the vehicle to increase, the operation is identical to that set forth under similar conditions in connection with the description of Fig. 3 and any further description in this respect would be mere repetition. If, when dynamically braking the vehicle, the power being transmitted from the traction means to the shaft 158 is sufficient to cause one of the traction means to slip or slide, the differential speed responsive device operates to effect an upward movement of power piston 373 and an angular movement of shaft 313, which by means of arms 468 and 312 effects a simultaneous closing movement of valve 446 and of the gas bypass damper 218, thereby simultaneously reducing the power being transmitted from the traction means to the shaft 158 and increasing or initiating the development of power by the gas turbine mounted thereon. This operation is also substantially identical to that described in connection with Fig. 3 and it is thought that a more detailed description in this respect is unnecessary for a complete understanding of the invention.

The arrangement shown in Fig. 4 inherently provides all of the advantages specifically set forth with respect to Fig. 3 and in addition permits the use of a hydraulic transmission means which is highly desirable in many applications. The invention, although illustrated as applied to the dynamic braking of gas turbine driven vehicles, is obviously of general application in connection with the dynamic braking of prime mover driven elements and it should be understood that it is not desired to limit the invention to the exact modes of operation and to the exact details of construction herein shown and described as various modifications within the scope of the appended claims may occur to persons skilled in the art.

It is claimed and desired to secure by Letters Patent:

1. In combination, a prime mover, a source of driving fluid for said prime mover, means for varying the energy content of said driving fluid, a bypass means arranged to permit driving fluid to bypass said prime mover, an element to be driven by said prime mover, a power transmission means establishing a driving connection between said prime mover and said element, a power transmission control operative to terminate the transmission of power from said prime mover to said element and operative when said element is in motion to then effect a transmission of power from said element to said prime mover, another control operative to vary the energy content of said driving fluid so as to operate said prime mover at a substantially constant predetermined speed, and said another control being also operative when power is being transmitted from said element to said prime mover to cause driving fluid to flow through said bypass means.

2. In combination, a prime mover, a source of driving fluid for said prime mover, means for varying the energy content of said driving fluid, a bypass means arranged to permit driving fluid to bypass said prime mover, an element to be driven by said prime mover, a power transmission means establishing a driving connection between said prime mover and said element, a power transmission control operative to terminate the transmission of power from said prime mover to said element and operative when said element is in motion to then effect a transmission of power from said element to said prime mover, another control operative to vary the energy content of said driving fluid so as to operate said prime mover at a substantially constant predetermined speed, and said another control being also operative when power is being transmitted from said element to said prime mover to cause driving fluid to flow through said bypass means, and means interconnecting said controls for varying the flow of driving fluid through said bypass means inversely with respect to variations in prime mover speed whenever the energy content of said driving fluid has been reduced to a predetermined minimum.

3. In combination, a prime mover means including a compressor, a combustion chamber, and a gas turbine, a source of fuel for said combustion chamber, a bypass means arranged to permit combustion gases leaving said combustion chamber to bypass said turbine, an element to be driven by the power developed by said prime mover means, a power transmission means establishing a driving connection between said prime mover means and said element, a power transmission control operative to terminate the transmission of power from said prime mover means to said element and operative when said element is in motion to then effect a transmission of power from said element to said prime mover means, and an energy input control for said turbine operative to vary the flow of fuel from said source to said combustion chamber so as to operate said turbine and compressor at a substantially constant predetermined speed, said energy input control including means rendered operative when power is being transmitted from said element to said prime mover means to cause combustion gases leaving said combustion chamber to flow through said bypass means.

4. In combination, a prime mover means including a compressor, a combustion chamber, and a gas turbine, a source of fuel for said combustion chamber, a bypass means arranged to permit combustion gases leaving said combustion chamber to bypass said turbine and to also permit air discharged from said compressor to bypass said combustion chamber and said turbine, an element to be driven by the power developed by said prime mover means, a power transmission means establishing a driving connection between said prime mover means and said element, a power transmission control operative to terminate the transmission of power from said prime mover means to said element and operative when said element is in motion to then effect a transmission of power from said element to said prime mover means, an energy input control for said turbine operative to vary the flow of fuel to said combustion chamber so as to operate said turbine and compressor at a substantially constant predetermined speed as the load on said prime mover means varies throughout the normal load range, said energy input control including means rendered operative when power is being transmitted from said element to said prime mover means to cause combustion gases leaving said combustion chamber to flow through said bypass means and to decrease further the flow of fuel to said combustion chamber, and means interconnecting said controls for varying the flow of combustion gases through said bypass means inversely with respect to variations in turbine speed whenever the flow of fuel to said combustion chamber has been reduced to a predetermined minimum.

5. In combination, a prime mover means including a compressor, a combustion chamber, and a gas turbine, a source of fuel for said combustion chamber, a bypass means arranged to permit combustion gases leaving said combustion chamber to bypass said turbine and to also permit air discharged from said compressor to bypass said combustion chamber and said turbine, an element to be driven by the power developed by said prime mover means, a power transmission means establishing a driving connection between said prime mover means and said element, a power transmission control operative to terminate the transmission of power from said prime mover means to said element and operative when the said element is in motion to then effect a variable transmission of power from said element to said prime mover means, an energy input control for said turbine operative to vary the flow of fuel from said source to said combustion chamber so as to operate the turbine and compressor at a substantially constant speed as the load on said prime mover means varies throughout the normal load range, said energy input control including means rendered operative when power is being transmitted from said element to said prime mover means to cause combustion gases leaving said combustion chamber to flow through said bypass means, to decrease further and in accordance with the flow of combustion gases through said bypass means the flow of fuel to said combustion chamber, and to cause some of the air discharged from said compressor to flow through said bypass means, and means interconnecting said controls for varying the flow of combustion gases through said bypass means inversely with respect to variations in turbine speed whenever the flow of fuel to said combustion chamber has been reduced to a predetermined minimum.

6. In combination, a prime mover means including a compressor, a combustion chamber, and a gas turbine, a source of fuel for said combustion chamber, a bypass means arranged to permit combustion gases leaving said combustion chamber to bypass said turbine and to also permit air discharged from said compressor to bypass said combustion chamber and said turbine, an element to be driven by the power developed by said prime mover means, a power transmission means establishing a driving connection between said prime mover means and said element, a power transmission control operative to terminate the transmission of power from said prime mover means to said element and operative when said element is in motion to then effect a variable transmission of power from said element to said prime mover means, an energy input control for said turbine including a first means operative to vary the flow of fuel from said source to said combustion chamber so as to operate the turbine and compressor at a substantially constant predetermined speed as the load on said prime mover varies throughout the normal load range, a second means rendered operative when power is being transmitted from said element to said prime mover means to cause combustion gases leaving said combustion chamber to flow through said bypass means, a third means operative in response to the flow of combustion gases through said bypass means to decrease further the flow of fuel to said combustion chamber, and a fourth means operative in response to said further decrease in the flow of fuel to said combustion chamber to cause some of the air discharged from said compressor to flow through said bypass means, and means interconnecting said controls for varying the flow of combustion gases through said bypass means inversely with respect to variations in turbine speed whenever the flow of fuel to said combustion chamber has been reduced to a predetermined minimum.

7. In combination with a vehicle having a traction means, a prime mover means including a compressor, a combustion chamber, and a gas turbine, a source of fuel for said combustion chamber, a bypass means arranged to permit combustion gases to bypass said turbine and to also permit air discharged from said compressor to bypass said combustion chamber and said turbine, a power transmission means establishing a driving connection between said prime mover means and said traction means, a power transmission control operative to terminate the transmission of power from said prime mover means to said traction means and operative when the vehicle is in motion to then effect a variable transmission of power from said traction means to said prime mover means, an energy input control for said turbine including a first means operative to vary the flow of fuel from said source to said combustion chamber so as to operate the turbine and compressor at a substantially constant predetermined speed as the load on said prime mover means varies throughout the normal load range, a second means rendered operative when power is being transmitted from said traction means to said prime mover means to cause combustion gases leaving said combustion chamber to flow through said bypass means, a third means operative in response to the flow of combustions gases through said bypass means to decrease further the flow of fuel to said combustion chamber in accordance with the flow of combustion gases through said bypass means, and a fourth means operative in response to said further decrease in the flow of fuel to said combustion chamber to cause some of the air discharged from said compressor to flow through said bypass means, means interconnecting said controls for varying the flow of combustion gases through said bypass means inversely with respect to variations in the turbine speed whenever the flow of fuel to said combustion chamber has been reduced to a predetermined minimum, and additional control means connected with said power transmission and energy input controls and with said traction means and being operative when the power transmitted from said traction means to said prime mover means is sufficient to cause said traction means to slip or slide, to effect a decrease in the power being transmitted to said prime mover means from said traction means and a decrease in the combustion gases flowing through said bypass means.

8. In combination with a vehicle having a traction means, a prime mover, a source of energy for said prime mover, a power transmission means establishing a driving connection between said prime mover and said traction means, a first control operative to terminate the transmission of power from said prime mover to said traction means and operative when the vehicle is in motion to then effect a variable transmission of power from said traction means to said prime mover, a second control operative to vary the energy input to said prime mover so as to operate said prime mover at a substantially constant speed as the load on said prime mover varies throughout the normal load range, said second control including means rendered operative when power is being transmitted from said traction means to said prime mover to effect a further reduction in the flow of energy from said source to said prime mover, and an additional control connected with said first and second controls and with said traction means and being operative when the power transmitted from said traction means to said prime mover is sufficient to cause said traction means to slip or slide to effect a decrease in the power being transmitted from said traction means to said prime mover and an increase in the flow of energy from said source to said prime mover.

9. In combination, a prime mover, an element to be driven by said prime mover, a source of energy for said prime mover, a control operative to vary the flow of energy from said source to said prime mover so as to operate said prime mover at a substantially constant predetermined speed, a power transmission including a hydraulic unit having a driving member connected to said prime mover and a driven member connected to said element, and a power transmission control operative when said element is being driven by said prime mover to terminate the transmission of power from said prime mover to said element and operative to cause the speed of said driven member to exceed the speed of said driving member thereby effecting a transmission of power from said element to said prime mover.

10. In combination, a prime mover, a source of energy for said prime mover, an element to be driven by said prime mover, a power transmission including a hydraulic unit having a driving member connected to said prime mover and a driven member connected to said element, a power transmission control operative when said element is being driven by said prime mover to terminate the transmission of power from said prime mover to said element and operative to cause the speed of said driven member to exceed the speed of said driving member thereby effecting a transmission of power from said element to said prime mover, said power transmission control being also then operative when the speed of said driven member exceeds the speed of said driving member to vary the power being transmitted from said element to said prime mover, and another control operative to vary the flow of energy from said source to said prime mover so as to operate said prime mover at a substantially constant predetermined speed as the load on said prime mover varies throughout the normal load range, said another control including means rendered operative when power is being transmitted from said element to said prime mover to reduce the flow of energy from said source to said prime mover below that required for normal no load operation.

11. In combination, a prime mover, a source of energy for operating said prime mover, an element which is to be driven by said prime mover and which is capable of attaining a speed in excess of that effected by the operation of the said prime mover, a power transmission means establishing a driving connection between said prime mover and said element, a first control operative to vary the energy input to said prime mover so as to operate said prime mover at a substantially constant predetermined speed as the load on said prime mover varies throughout the normal load range, a second control operative to vary the transmission of power between said prime mover and element, and means rendering said first control operative, whenever the energy input to said prime mover has been reduced to a predetermined minimum and the speed of said element increases, to effect a sufficient reduction in the power being transmitted from said element to said prime mover to maintain the said prime mover operating at the said constant predetermined speed.

12. In combination with a vehicle having a traction means, a prime mover, a source of energy for operating said prime mover, a power transmission means establishing a driving connection between said prime mover and said traction means, a first control operative to vary the energy input to said prime mover so as to operate said prime mover at a substantially constant predetermined speed as the load on said prime mover varies throughout the normal load range, a second control operative to vary the transmission of power between said prime mover and traction means, and means interconnecting said first and second controls and rendering said first control operative, whenever the energy input to said prime mover has been reduced to a predetermined minimum and the speed of said vehicle increases, to effect a reduction in the power being transmitted from said traction means to said prime mover to thereby maintain said prime mover operating at the said constant predetermined speed while dynamically braking said vehicle.

13. In combination, a prime mover, a source of energy for operating said prime mover, an element which is to be driven by said prime mover and which is capable of attaining a speed in excess of that effected by the operation of said prime mover, means interconnecting said prime mover and element for transmission of power from said prime mover to said element and from said element to said prime mover, a first control effective to vary the energy input to said prime mover for operating same at a substantially constant predetermined speed throughout its normal load range, a second control effective to vary the transmission of power between said prime mover and element, and means interconnecting said first and second controls for varying the transmission of power from said element to said prime mover inversely with respect to variations in prime mover speed whenever the energy input to said prime mover has been reduced to a predetermined minimum.

14. In combination with a vehicle having a traction means, a prime mover, a source of energy for operating said prime mover, means interconnecting said prime mover and traction means for transmission of power from said prime mover to said traction means and from said traction means to said prime mover, a first control effective to vary the energy input to said prime mover for operating same at a substantially constant predetermined speed throughout its normal load range, a second control effective to vary the transmission of power between said prime mover and traction means, and means interconnecting said first and second controls for varying the transmission of power from said traction means to said prime mover inversely with respect to variations in prime mover speed whenever the energy input to said prime mover has been reduced to a predetermined minimum.

15. In combination, a prime mover requiring a no-load energy input at least equal to a major portion of its full-load energy output capacity, a source of energy for operating said prime mover, an element which is to be driven by said prime mover and which is capable of attaining a speed in excess of that effected by said prime mover under predetermined normal conditions, means interconnecting said prime mover and element for transmission of power from said prime mover to said element and from said element to said prime mover, a first means effective to vary the energy input to said prime mover, and a second means effective to vary the transmission of power between said prime mover and element including varying the transmission of power from said element to said prime mover inversely with respect to variations in prime mover speed in order to maintain said prime mover operating at a predetermined minimum speed sufficient to absorb the energy transmitted to said prime mover while dynamically braking said element.

16. In combination, a prime mover requiring a no-load energy input at least equal to a major portion of its full-load energy output capacity, a source of energy for operating said prime mover, an element which is to be driven by said prime mover and which is capable of attaining a speed in excess of that effected by said prime mover under predetermined normal conditions, means interconnecting said prime mover and element for transmission of power from said prime mover to said element and from said element to said prime mover, a first means effective to vary the energy input to said prime mover for operating same at a substantially constant predetermined speed throughout its normal load range, and a second means effective to vary the transmission of power between said prime mover and element including varying the transmission of power from said element to said prime mover inversely with respect to variations in prime mover speed in order to maintain said prime mover operating at said predetermined speed while dynamically braking said element.

17. In combination with a vehicle having a traction means, a prime mover requiring a no-load energy input at least equal to a major portion of its full-load energy output capacity, a source of energy for operating said prime mover, means interconnecting said prime mover and traction means for transmission of power from said prime mover to said traction means and from said traction means to said prime mover, a first means effective to vary the energy input to said prime mover, and a second means effective to vary the transmission of power between said prime mover and traction means including varying the transmission of power from said traction means to said prime mover inversely with respect to variations in prime mover speed in order to maintain said prime mover operating at a predetermined minimum speed sufficient to absorb the energy transmitted to said prime mover while dynamically braking said traction means.

18. In combination with a vehicle having a plurality of independent traction means, a power unit thereon including a prime mover requiring a no-load energy input at least equal to a major portion of its full-load energy output capacity and a source of energy for operating said prime mover, means for transmitting power from said prime mover to said traction means and from said traction means to said prime mover comprising a separately excited motor driving each of said traction means, separately excited generators, one for each driving motor, driven by said prime mover, and a plurality of independent circuits each including an armature of one of said motors and an armature of one of said generators, a first means effective to vary the energy input to said prime mover, and a second means effective to uniformly and simultaneously vary the excitation of said generators including variations effective whenever the energy input to the power unit is reduced to a predetermined minimum to vary the transmission of power from said traction means to said prime mover inversely with respect to variations in prime mover speed in order to maintain said prime mover operating at a predetermined minimum speed sufficient to absorb the energy transmitted to said prime mover while dynamically braking said vehicle.

19. In combination with a vehicle having a plurality of independent traction means, a power unit thereon including a prime mover and a source of energy for operating said prime mover, means for transmitting power from said prime mover to said traction means and from said traction means to said prime mover comprising a separately excited motor driving each of said traction means, separately excited generators, one for each driving motor, driven by said prime mover, and a plurality of independent circuits each including an armature of one of said motors and an armature of one of said generators, a first means effective to vary the energy input to said prime mover for operating said prime mover at a substantially constant predetermined speed throughout its normal load range, and a second means effective to uniformly and simultaneously vary the excitation of said generators including variations effective whenever the energy input to the power unit is reduced to a predetermined minimum to vary the transmission of power from said traction means to said prime mover inversely with respect to variations in prime mover speed in order to maintain said prime mover operating at said predetermined speed while dynamically braking said vehicle.

20. In combination with a vehicle having a plurality of independent traction means, a power unit thereon including a prime mover requiring a no-load energy input at least equal to a major portion of its full-load energy output capacity and a source of energy for operating said prime mover, means for transmitting power from said prime mover to said traction means and from said tractions means to said prime mover comprising a separately excited motor driving each of said traction means, separately excited generators, one for each driving motor, driven by said prime mover, and a plurality of independent circuits each including an armature of one of said motors and an armature of one of said generators, a first means effective to vary the energy input to said prime mover for operating said prime mover at a substantially constant predetermined speed throughout its normal load range, and a second means effective to uniformly and simultaneously vary the excitation of said generators including variations effective whenevery the energy input to the power unit is reduced to a predetermined minimum to vary the transmission of power from said traction means to said prime mover inversely with respect to variations in prime mover speed in order to maintain said prime mover operating at said predetermined speed while dynamically braking said vehicle.

HAROLD R. ANDERSON.
NATHAN WILKINSON.
JAMES L. RAY.